United States Patent [19]
Chiu

[11] Patent Number: 5,532,895
[45] Date of Patent: Jul. 2, 1996

[54] OVERLOAD PROTECTION DEVICE

[76] Inventor: Ming-Hsiang Chiu, Hsin-Chuang No. 8-22, Mei-Yuan Li, Chia-Yi City, Taiwan

[21] Appl. No.: 339,565

[22] Filed: Nov. 15, 1994

[51] Int. Cl.[6] .................................................. H02H 7/04
[52] U.S. Cl. ............................................. 361/35; 361/89
[58] Field of Search .......................... 361/88, 89, 91, 361/93, 94, 35, 187, 195

[56] References Cited

U.S. PATENT DOCUMENTS

| | | | |
|---|---|---|---|
| 3,868,549 | 2/1975 | Schaefer et al. | 361/13 |
| 4,027,203 | 5/1977 | Moran et al. | 361/89 |
| 4,358,810 | 11/1982 | Wafer et al. | 361/93 |

*Primary Examiner*—Jeffrey A. Gaffin
*Assistant Examiner*—Sally C. Medley
*Attorney, Agent, or Firm*—Ladas & Parry

[57] ABSTRACT

An overload protection device is to be used in a current-carrying circuit which includes an AC power source and at least one load. The overload protection device includes a resistor, a transformer and a control circuit. The resistor is to be connected to the AC power source and the load so as to interconnect the AC power source and the load. The transformer has a primary winding connected across the resistor and further has a secondary winding. The control circuit is connected to the secondary winding of the transformer, and includes a switch unit that is to be connected to the AC power source and the load so as to interconnect normally the AC power source and the load. The switch unit disconnects the load from the AC power source when voltage at the secondary winding of the transformer reaches a predetermined overload voltage.

4 Claims, 8 Drawing Sheets

OVERLOAD PROTECTION DEVICE

BACKGROUND OF THE INVENTION

1. Field of the Invention

The invention relates to an overload protection device, more particularly to an overload protection device which has a relatively fast response time, which is not easily susceptible to erroneous operation due to the presence of noise, and which is capable of automatically closing a current-carrying circuit upon detection that the overload condition has elapsed.

2. Description of the Related Art

Conventional overload protection devices, such as fuses and non-fuse breakers, provide protection against excessive currents. In fuses, a fusible metal strip melts when the current therethrough exceeds the rated value for a definite time, thereby opening a current-carrying circuit. Non-fuse breakers, on the other hand, may be thermal or electromagnetic devices which open a current-carrying circuit automatically when the current therethrough exceeds a predetermined value.

The main drawbacks of conventional overload protection devices reside in their relatively slow response times and their susceptibility to erroneous operation due to the presence of noise. Thus, conventional overload protection devices are unsuitable for use in highly-sensitive equipments.

Another drawback of conventional overload protection devices is that they must be replaced (in case of fuses) or reset automatically by operating a lever (in case of non-fuse breakers) in order to close a current-carrying circuit. Therefore, it would be desirable to have an overload protection device which can close automatically a current-carrying circuit upon detecting that the overload condition has elapsed.

SUMMARY OF THE INVENTION

The object of the present invention is to provide an overload protection device which has a relatively fast response time and which is not easily susceptible to erroneous operation due to the presence of noise.

Another object of the present invention is to provide an overload protection device which is capable of closing automatically a current-carrying circuit upon detection that the overload condition has elapsed.

Accordingly, the overload protection device of the present invention is to be used in a current-carrying circuit which includes an AC power source and at least one load, and comprises a resistor, a transformer and a control circuit. The resistor is to be connected to the AC power source and the load so as to interconnect the AC power source and the load. The transformer has a primary winding connected across the resistor and further has a secondary winding. The control circuit is connected to the secondary winding of the transformer, and includes a switch unit that is to be connected to the AC power source and the load so as to interconnect normally the AC power source and the load. The switch unit disconnects the load from the AC power source when voltage at the secondary winding of the transformer reaches a predetermined overload voltage. Preferably, the switch unit includes a relay with a coil connected to the secondary winding of the transformer and electrical contacts which interconnect the AC power source and the load in a first mode and which disconnect the load from the AC power source in a second mode.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENTS

Before the present invention is described in greater detail, it should be noted that like elements are indicated by the same reference numerals throughout the disclosure.

Figure 1:
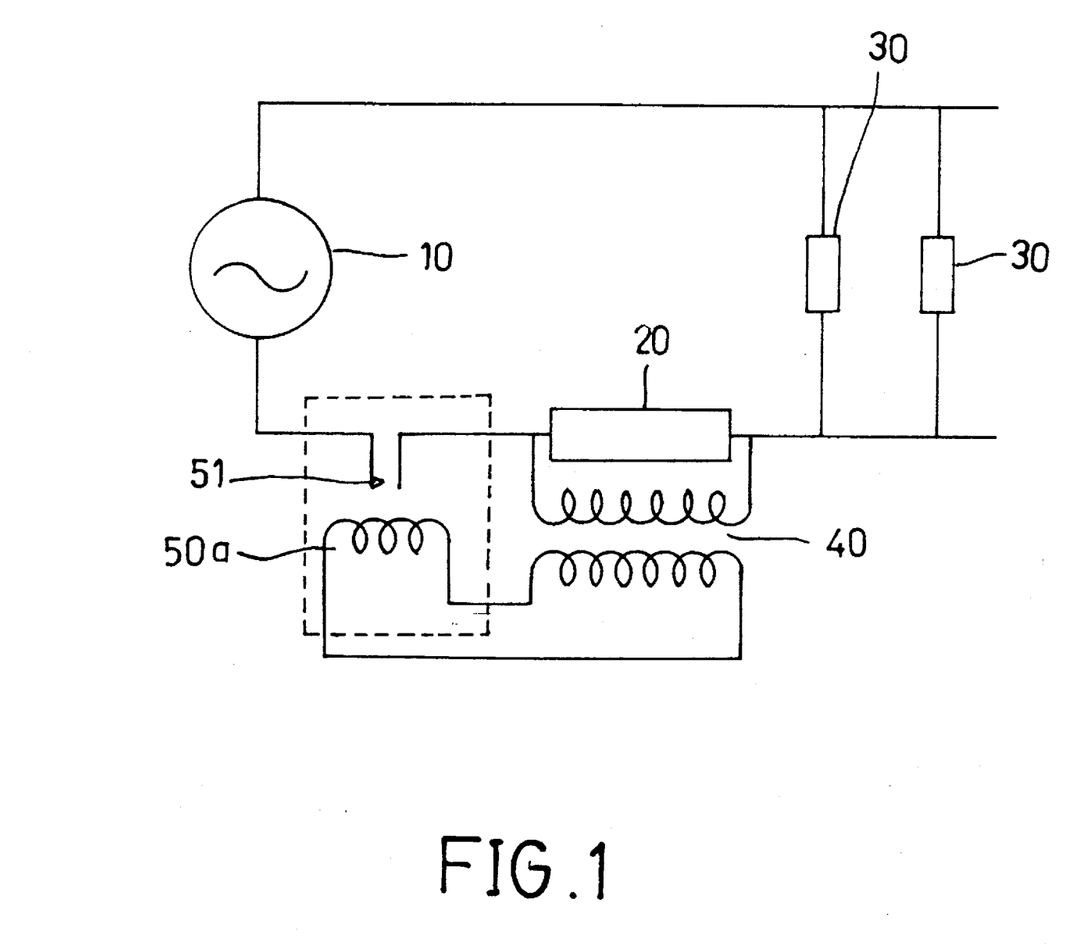
FIG. 1 is a schematic electrical circuit diagram of the first preferred embodiment of an overload protection device according to the present invention.

Referring to FIG. 1, the first preferred embodiment of an overload protection device according to the present invention is used in a current-carrying circuit which includes an AC power source 10 and at least one load 30. The overload protection device comprises a resistor 20, a transformer 40 and a control circuit 50a. The resistor 20 interconnects the AC power source 10 and the load 30. The transformer 40 has a primary winding connected across the resistor 20 and further has a secondary winding. The control circuit 50a is connected to the secondary winding of the transformer 40 and includes a switch unit 51 which interconnects normally the AC power source 10 and the load 30. In this embodiment, the switch unit 51 is a manually resettable relay with a coil connected to the secondary winding of the transformer 40 and normally-closed electrical contacts which interconnect the AC power source 10 and the load 30.

The operation of the first preferred embodiment is described as follows: Current through the resistor 20 results in a voltage drop thereat. The voltage drop across the resistor 20 induces a voltage at the secondary winding of the transformer 40. The switch unit 51 is designed such that, under normal conditions, the nonoperate voltage of the relay (or the maximum value of coil voltage at which the relay will not operate) is greater than the voltage at the secondary winding of the transformer 40. The normally-closed electrical contacts of the relay remain closed, thereby maintaining the current-carrying circuit in a closed state.

When an overload condition occurs, a larger current flows through the resistor 20 to result in a larger voltage at the secondary winding of the transformer 40. At this stage, the voltage at the secondary winding of the transformer 40 reaches a predetermined overload voltage which is equal to the operate voltage of the relay (or the minimum value of coil voltage at which switching function is completed), thereby energizing the relay to open the normally-closed electrical contacts, thus disconnecting the load 30 from the AC power source 10 to open the current-carrying circuit. The relay can be reset manually when the overload condition has elapsed.

It has thus been shown that, in this embodiment, the transformer 40 detects the voltage drop across the resistor 20 to determine whether excessive amounts of current flow therethrough, and actuates the control circuit 50a so as to open the current-carrying circuit when an overload condition occurs. The overload protection device has a relatively fast response time and is more sensitive than conventional overload protection devices. In addition, the transformer 40 serves to protect the control circuit 50a from excessive amounts of current through the current-carrying circuit, and can prevent a sudden surge in the current through the current-carrying circuit. Preferably, the resistance of the resistor 20 should be much smaller than that of the primary winding of the transformer 40 to prevent current in the circuit from damaging the transformer 40.

Figure 2:
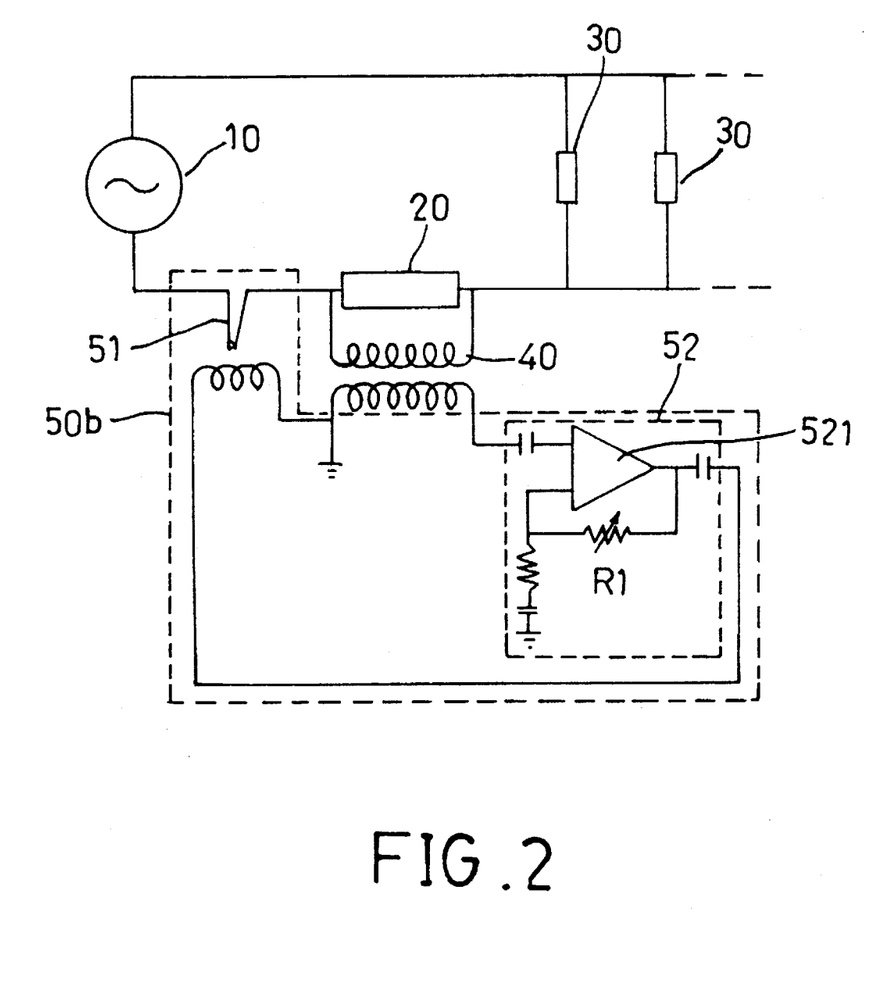
FIG. 2 is a schematic electrical circuit diagram of the second preferred embodiment of an overload protection device according to the present invention.

Referring to FIG. 2, the control circuit 50b of the second preferred embodiment of an overload protection device according to the present invention is shown to further comprise a variable-gain amplifier circuit 52 which interconnects the switch unit 51 and the secondary winding of the transformer 40. The amplifier circuit 52 serves to amplify the voltage at the secondary winding of the transformer 40 and includes an operational amplifier 521 and a variable resistor R1 for adjusting the gain of the operational amplifier 521 to adjust correspondingly the sensitivity of the overload protection device.

Figure 3:
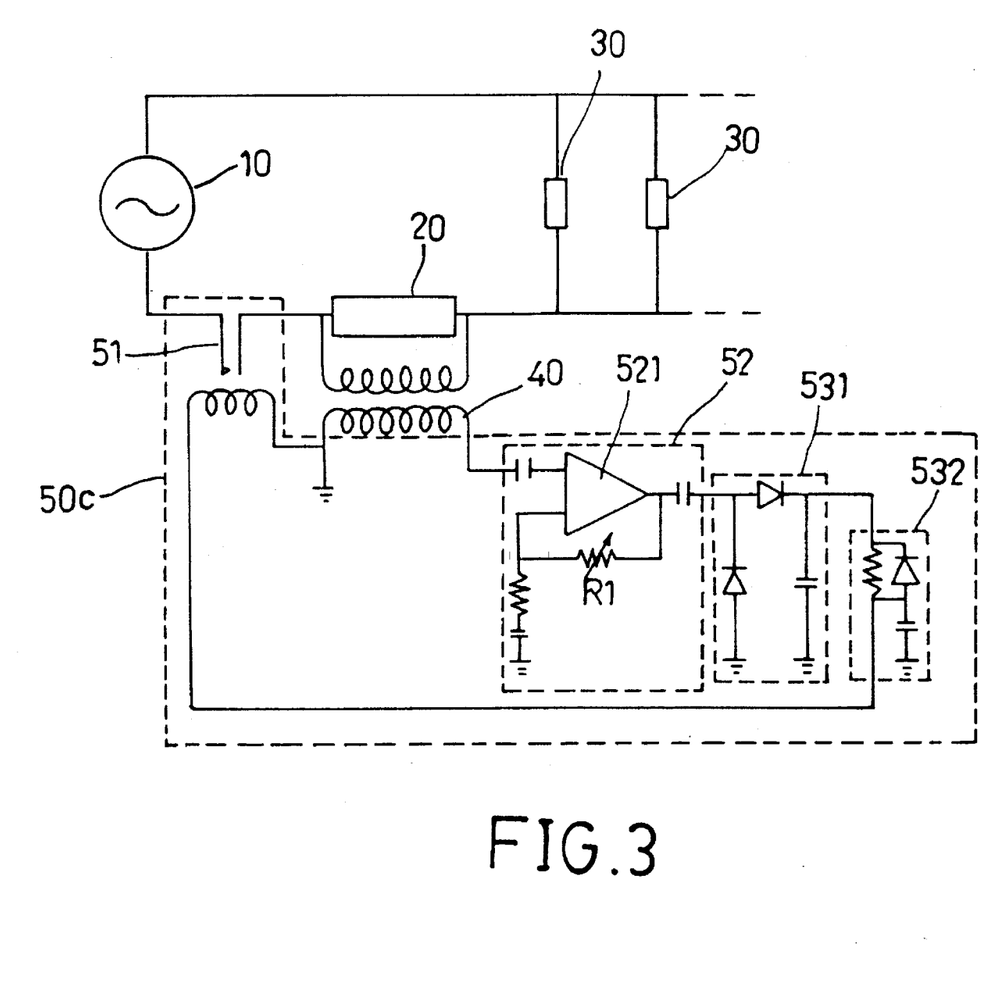
FIG. 3 is a schematic electrical circuit diagram of the third preferred embodiment of an overload protection device according to the present invention.

Referring to FIG. 3, the third preferred embodiment of an overload protection device according to the present invention is shown to be substantially similar to the second preferred embodiment. The control circuit 50c of the third preferred embodiment, however, further comprises a rectifier circuit 531 which is connected to the output terminal of the amplifier circuit 52, and an RC delay circuit 532 which interconnects the rectifier circuit 531 and the switch unit 51. The rectifier circuit 531 converts the amplified output of the amplifier circuit 52 into a dc signal which, after passing through the delay circuit 532, is used to actuate the switch unit 51. The rectifier circuit 531 and the delay circuit 532 provide added protection against erroneous operation of the overload protection device due to the presence of a sudden surge in the current through the current-carrying circuit.

Figure 4:
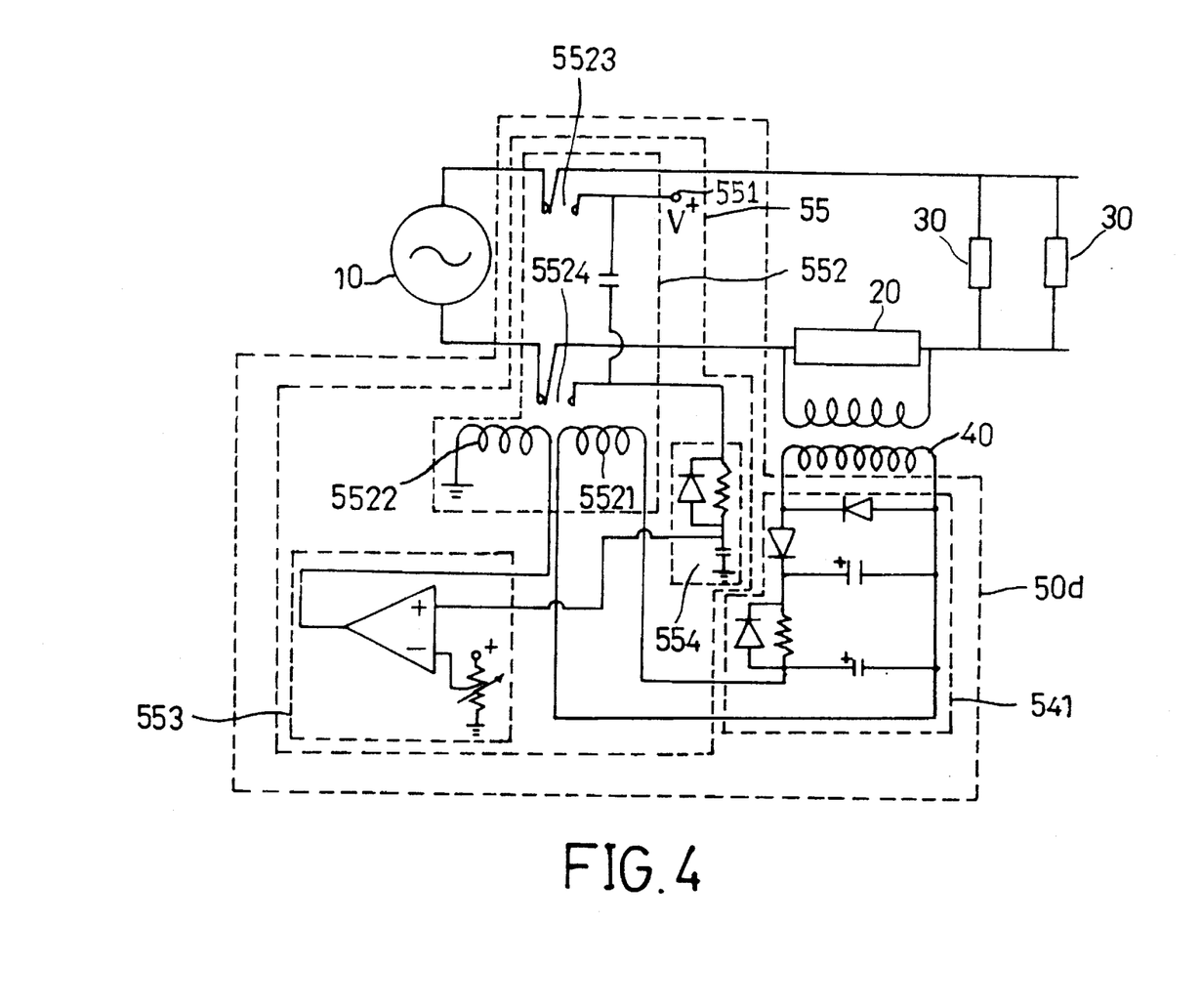
FIG. 4 is a schematic electrical circuit diagram of the fourth preferred embodiment of an overload protection device according to the present invention.

Referring to FIG. 4, the control circuit 50d of the fourth preferred embodiment of an overload protection device according to the present invention is shown to comprise a rectifier circuit 541 which is connected to the secondary winding of the transformer 40, and an automatically resettable switch unit 55 which interconnects the AC power source 10 and the load 30. In this embodiment, the switch unit 55 includes a DC power source 551, a relay unit 552, a comparator 553 and a charging circuit 554. The relay unit 552 has a first coil 5521 connected to the rectifier circuit 541, a second coil 5522, and first and second sets of electrical contacts 5523, 5524 that interconnect the AC power source 10 and the load 30 in a first mode and that interconnect the DC power source 551 and the load 30 in a second mode. The charging circuit 554 is to be connected serially to the load 30 by the second set of electrical contacts 5524 when the first and second sets of electrical contacts 5523, 5524 are in the second mode. The comparator 553 has a first input connected to the charging circuit 554, a second input which receives a reference voltage, and an output terminal connected to the second coil 5522.

The operation of the fourth preferred embodiment is described as follows: During normal conditions, the voltage at the secondary winding of the transformer 40 is insufficient to energize the first coil 5521, while the comparator 553 does not energize the second coil 5522. Thus, under these conditions, the electrical contacts 5523, 5524 interconnect the AC power source 10 and the load 30.

When an overload condition occurs, the voltage at the secondary winding of the transformer 40 exceeds a predetermined overload voltage and becomes sufficient to energize the first coil 5521, thereby actuating the electrical contacts 5523, 5524 to operate in the second mode. At this instant, the first coil 5521 ceases to be energized. Since the load 30 and the charging circuit 554 are now connected in series across the DC power source 551, and since the resistance of the load 30 is much less than that of the charging circuit 554 during overload, a larger voltage drop is now present across the charging circuit 554. Thus, the comparator 554 is actuated to energize the second coil 5522 to maintain the electrical contacts 5523, 5524 in the second mode. When the overload condition has elapsed, the resistance of the load 30 becomes greater than that when the overload condition is still present, thereby decreasing the voltage drop across the charging circuit 554. The comparator 554 ceases to energize the second coil 5522, thus actuating the electrical contacts 5523, 5524 to interconnect once more the AC power source 10 and the load 30.

Figure 5:
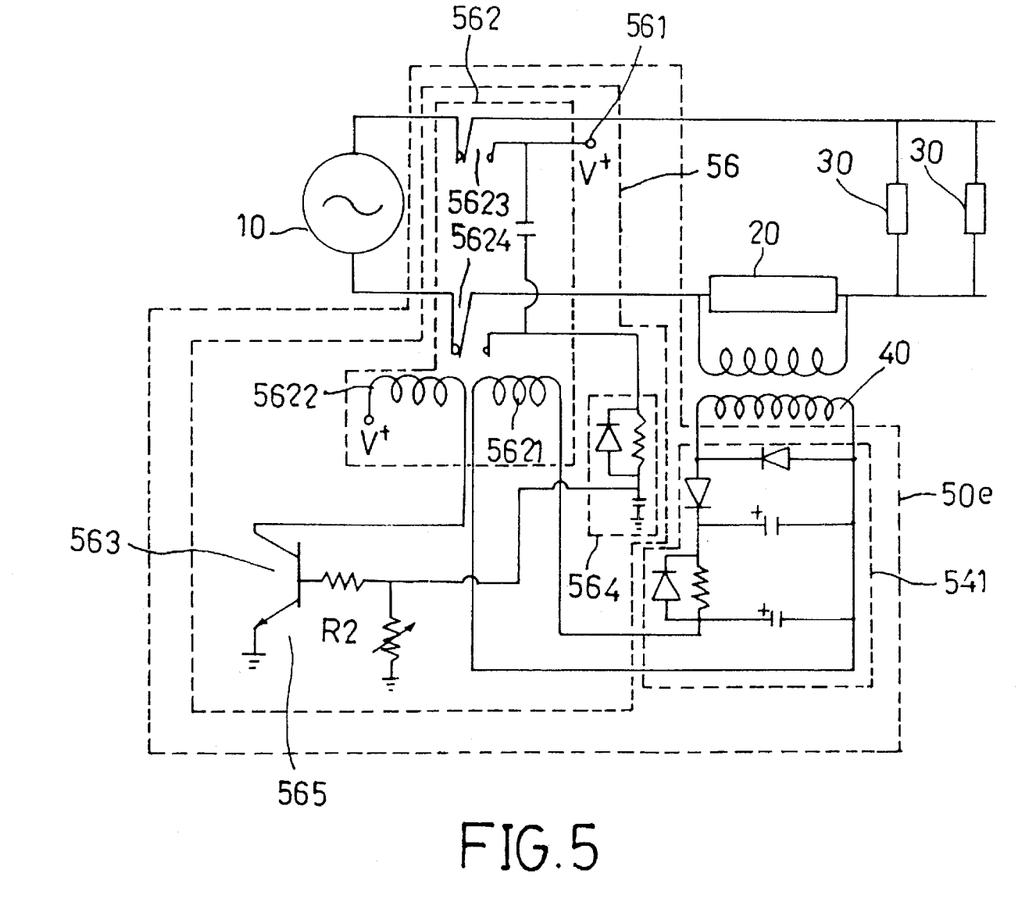
FIG. 5 is a schematic electrical circuit diagram of the fifth preferred embodiment of an overload protection device according to the present invention.

Referring to FIG. 5, the control circuit 50e of the fifth preferred embodiment of an overload protection device according to the present invention is shown to be substantially similar to that of the fourth preferred embodiment, the main difference residing in the construction of the automatically resettable switch unit 56. The switch unit 56 includes a DC power source 561, a relay unit 562, a transistor 563, a charging circuit 564 and a resistor network 565. The relay unit 562 has a first coil 5621 connected to the rectifier circuit 541, a second coil 5622, and first and second sets of electrical contacts 5623, 5624 that interconnect the AC power source 10 and the load 30 in a first mode and that interconnect the DC power source 561 and the load 30 in a second mode. The charging circuit 564 is to be connected serially to the load 30 by the second set of electrical contacts 5624 when the electrical contacts 5623, 5624 are in the second mode. The transistor 563 interconnects the second coil 5622 and the DC power source 561. The resistor network 565 includes a variable resistor R2 and interconnects the charging circuit 564 and a base terminal of the transistor 563.

During normal conditions, the voltage at the secondary winding of the transformer 40 is insufficient to energize the first coil 5621, while the transistor 563 is cut off, thereby disconnecting the second coil 5622 from the DC power source 561. Thus, under these conditions, the electrical contacts 5623, 5624 interconnect the AC power source 10 and the load 30.

When an overload condition occurs, the voltage at the secondary winding of the transformer 40 exceeds a predetermined overload voltage and becomes sufficient to energize the first coil 5621, thereby actuating the electrical contacts 5623, 5624 to operate in the second mode. At this instant, the first coil 5621 ceases to be energized. Since the load 30 and the charging circuit 564 are now connected in series across the DC power source 561, and since the resistance of the load 30 is much less than that of the charging circuit 564 during overload, a larger voltage drop is present across the charging circuit 564. The voltage drop across the charging circuit 564 becomes sufficient to trigger the transistor 563 to conduct, thereby permitting the flow of current through the second coil 5622 so as to energize the latter. Thus, the electrical contacts 5623, 5624 can be maintained in the second mode. When the overload condition has elapsed, the resistance of the load 30 becomes greater than that when the overload condition is still present, thereby decreasing the voltage drop across the charging circuit 564. The transistor 563 ceases to conduct, and the second coil 5622 is de-energized, thus actuating the electrical contacts 5623, 5624 to interconnect once more the AC power source 10 and the load 30.

In this embodiment, the variable resistor R2 is adjusted to vary the trigger voltage of the transistor 563 and adjust correspondingly the sensitivity of the overload protection device.

Figure 6:
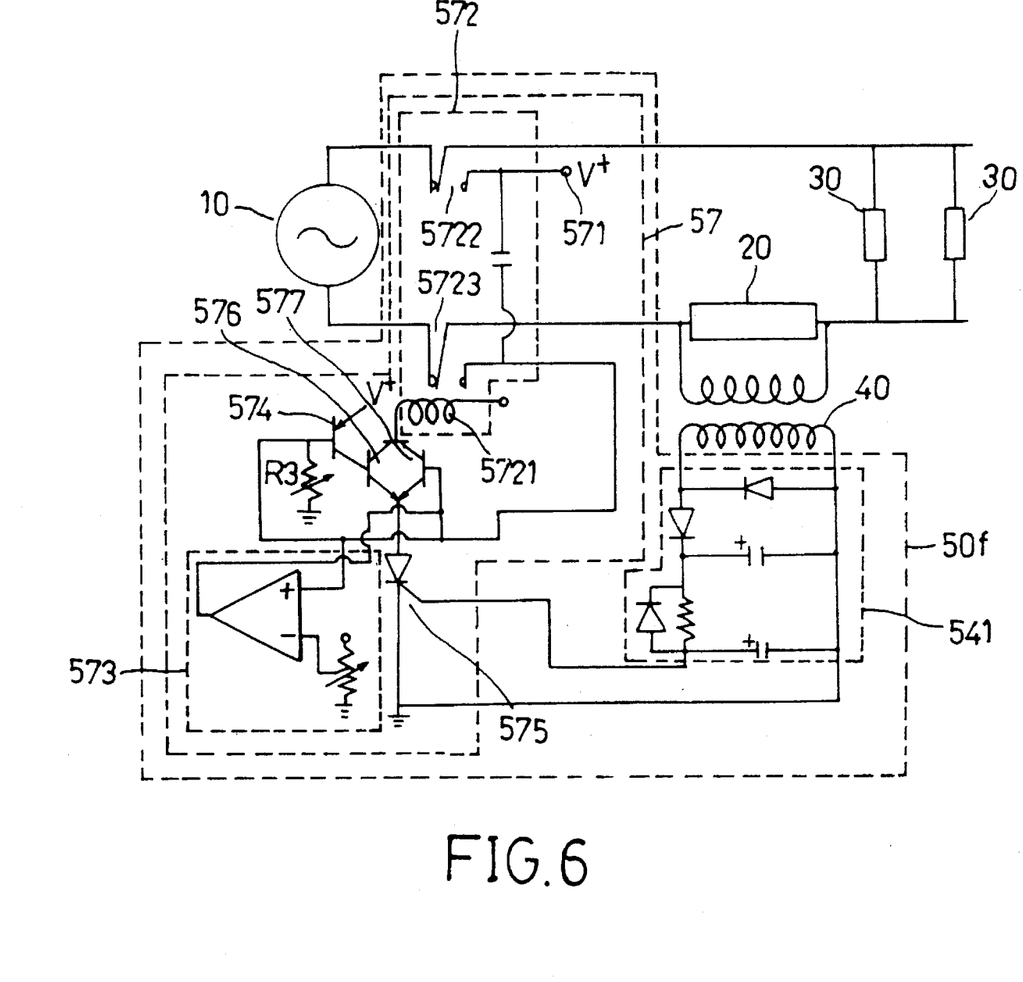
FIG. 6 is a schematic electrical circuit diagram of the sixth preferred embodiment of an overload protection device according to the present invention.

Referring to FIG. 6, the control circuit 50*f* of the sixth preferred embodiment of an overload protection device similarly comprises a rectifier circuit 541 and an automatically resettable switch unit 57'. In this embodiment, the switch unit 57 includes a DC power source 571, a relay unit 572, a comparator 573, a control transistor 574, a thyristor 575, and a transistor pair including first and second transistors 576, 577. The relay unit 572 has a coil 5721 connected to the DC power source 571 and first and second sets of electrical contacts 5722, 5722 that interconnect the AC power source 10 and the load 30 in a first mode and that interconnect the DC power source 571 and the load 30 in a second mode. The thyristor 575 is preferably a silicon-controlled rectifier (SCR) and has a gate terminal connected to the rectifier circuit 541, an anode terminal and a grounded cathode terminal. The first and second transistors 576, 577 have interconnected collectors that are connected to the coil 5721 and interconnected emitters that are connected to the anode of the thyristor 575. The control transistor 574 has an emitter connected to the DC power source 571, a base with a variable resistor R3 connected thereat, and a collector connected to the base of the first transistor 576. Thus, conduction of the first transistor 576 is controlled by the control transistor 574. The base of the control transistor 574 is to be connected serially by the second set of electrical contacts 5723 to the load 30 when the electrical contacts 5722, 5723 are in the second mode. The comparator 573 has a first input connected to the base terminal of the control transistor 574, a second input which receives a reference voltage, and an output terminal connected to the base terminal of the second transistor 577. The comparator 573 controls the conduction of the second transistor 577.

The operation of the sixth preferred embodiment is described as follows: During normal conditions, the control transistor 574 triggers the first transistor 576 to conduct. The voltage across the variable resistor R3, however, is insufficient to enable the comparator 573 to trigger the second transistor 577 to conduct. The voltage at the secondary winding of the transformer 40 is similarly insufficient to cause the thyristor 575 to conduct. Therefore, current is unable to flow through the coil 5721, and the electrical contacts 5722, 5723 interconnect the AC power source 10 and the load 30 at this time.

When an overload condition occurs, the voltage at the secondary winding of the transformer 40 exceeds a predetermined overload voltage and becomes sufficient to trigger the thyristor 575 to conduct. Conduction of the first transistor 576 permits current flow from the DC power source 571 through the coil 5721 via the first transistor 576 and the thyristor 575, thereby actuating the electrical contacts 5722, 5723 to operate in the second mode. At this instant, the second set of electrical contacts 5723 further connects the load 30 in series with the variable resistor R3, and the control transistor 574 ceases to actuate the first transistor 576. However, because the resistance of the load 30 is much less than that of the variable resistor R3 during overload, a larger voltage drop is present across the variable resistor R3. Thus, the comparator 574 is actuated to trigger the second transistor 577 to conduct in order to maintain current flow through the coil 5721. When the overload condition has elapsed, the resistance of the load 30 becomes greater than that when the overload condition is still present, thereby decreasing the voltage drop across the variable resistor R3. The comparator 574 ceases to actuate the second transistor 577, and current flow through the coil 5721 is interrupted, thus actuating the electrical contacts 5722, 5723 to interconnect once more the AC power source 10 and the load 30.

Figure 7:
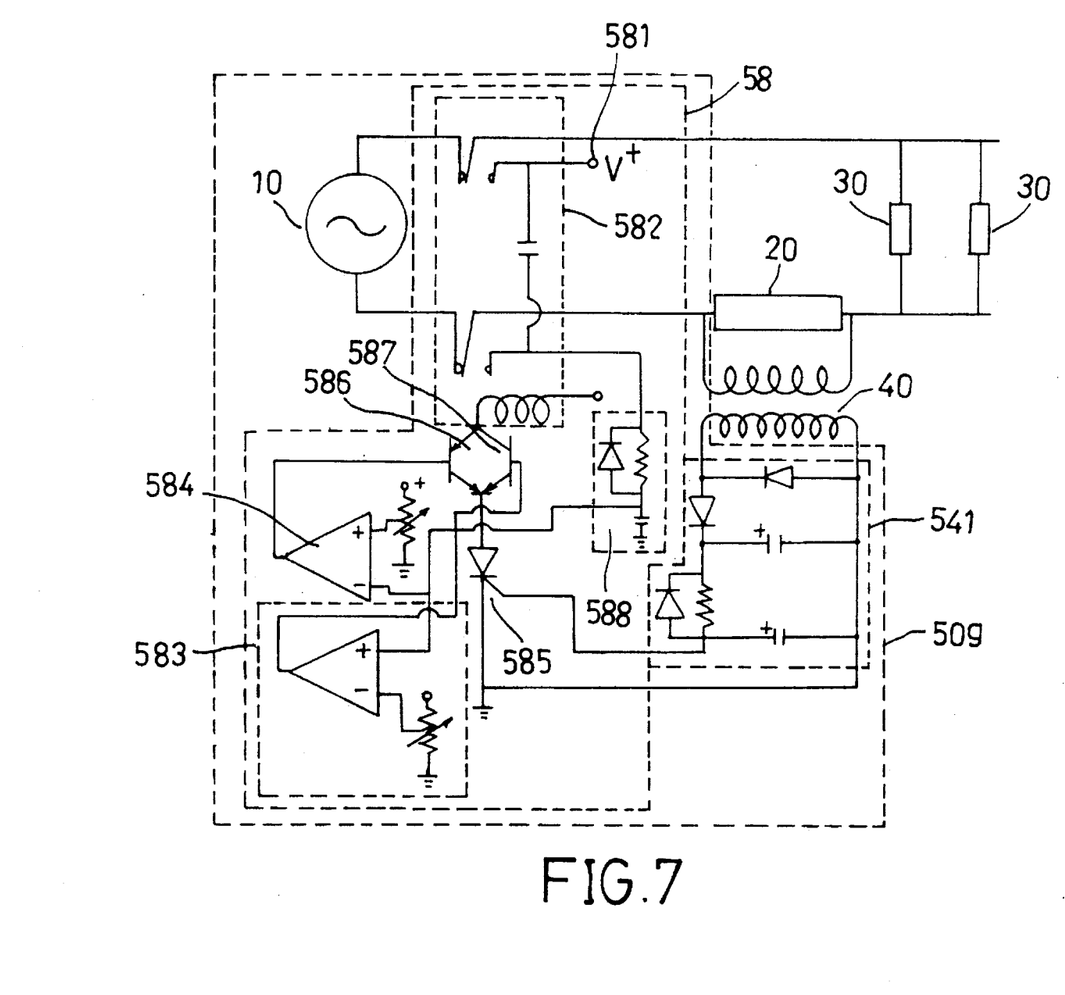
FIG. 7 is a schematic electrical circuit diagram of the seventh preferred embodiment of an overload protection device according to the present invention.

Referring to FIG. 7, the switch unit 58 of the control circuit 50*g* of the seventh preferred embodiment of an overload protection device according to the present invention is shown to be substantially similar to that of the previous embodiment. The switch unit 58 includes a DC power source 581, a relay unit 582, a first comparator 583, a second comparator 584, a thyristor 585, a transistor pair including first and second transistors 586, 587, and a charging circuit 588. In this embodiment, the charging circuit 588 is to be connected serially to the load 30 by the relay unit 582 when the relay unit 582 is operated in the second mode. The second comparator 584 has a first input which receives a reference voltage. The first input of the first comparator 583 and the second input of the second comparator 584 are connected to the charging circuit 588. The second input of the first comparator 583 similarly receives a reference voltage. The base terminal of the first transistor 586 is connected to the output terminal of the second comparator 584, while the base terminal of the second transistor 587 is connected to the output terminal of the first comparator 583. Thus, the first and second comparators 583, 584 control the conduction of the second and first transistors 587, 586, respectively.

The operation of the seventh preferred embodiment is substantially similar to that of the previous embodiment. During normal conditions, the second comparator 584 causes the first transistor 586 to conduct. The voltage across the charging circuit 588 is insufficient to enable the first comparator 583 to trigger the second transistor 587 to conduct. The voltage at the secondary winding of the transformer 40 is similarly insufficient to cause the thyristor 585 to conduct. Therefore, current is unable to flow through the coil 5821, and the electrical contacts 5822, 5823 interconnect the AC power source 10 and the load 30 at this time.

When an overload condition occurs, the thyristor 585 conducts, and current initially flows through the coil of the relay unit 582 via the first transistor 586 and the thyristor 585. The electrical contacts of the relay unit 582 are actuated to operate in the second mode. At this instant, since the load 30 is in series with the charging circuit 588, and since the resistance of the load 30 is much less than that of the charging circuit 588 during overload, a larger voltage drop is present across the charging circuit 588. The second comparator 584 deactivates the first transistor 586. However, the first comparator 583 is actuated to trigger the second transistor 587 to conduct so as to maintain current flow through the coil of the relay unit 588. When the overload condition has elapsed, the resistance of the load 30 becomes greater than that when the overload condition is still present, thereby decreasing the voltage drop across the charging circuit 588. The first comparator 583 ceases to actuate the second transistor 587, and current flow through the coil of the relay unit 588 is interrupted, thus actuating the electrical contacts of the relay unit 588 to interconnect once more the AC power source 10 and the load 30.

Figure 8:
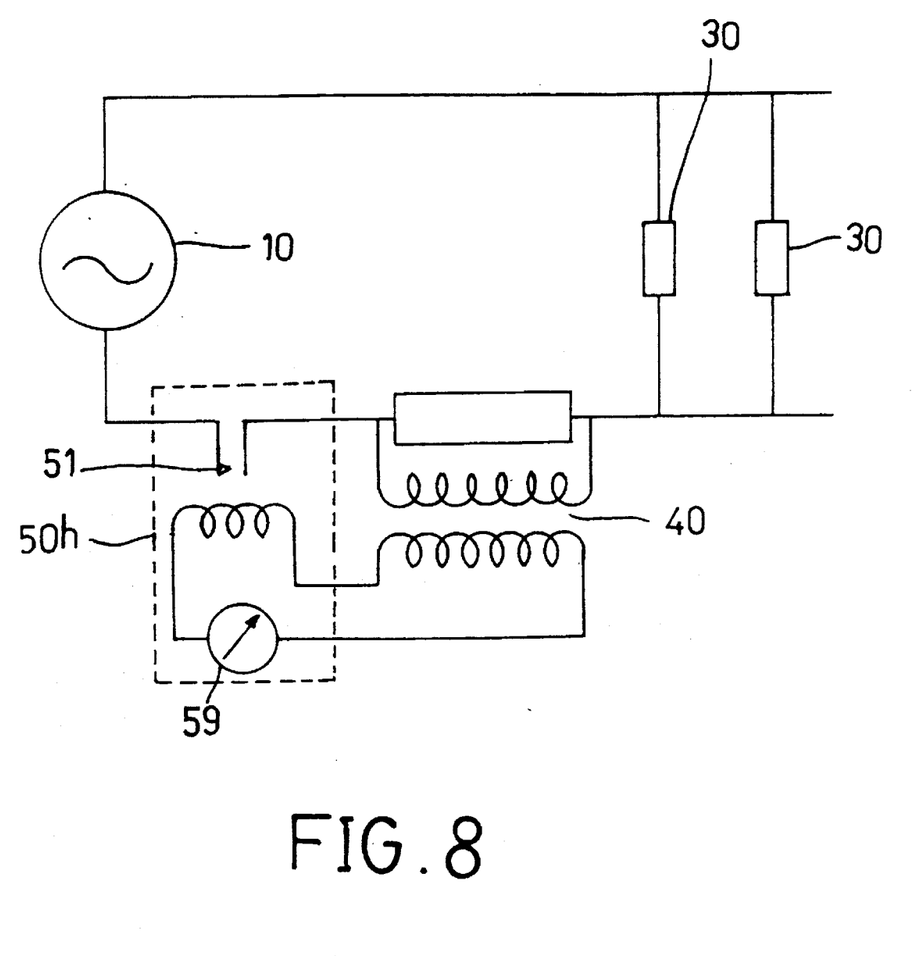
FIG. 8 is a schematic electrical circuit diagram of the eighth preferred embodiment of an overload protection device according to the present invention.

FIG. 8 illustrates the eighth preferred embodiment of an overload protection device according to the present invention. The eighth preferred embodiment is shown to be substantially similar to the first preferred embodiment. The control circuit 50h of the eighth preferred embodiment, however, further includes an overload indicator 59 which interconnects the secondary winding of the transformer 40 and the switch unit 51. The overload indicator 59 is used to warn the user that the addition of another load 30 will result in overload.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An overload protection device for use in a current-carrying circuit which includes an AC power source and at least one load, said overload protection device comprising:

a resister to be connected to the AC power source and the load so as to interconnect the AC power source and the load;

a transformer having a primary winding connected across said resistor, and a secondary winding; and a control circuit connected to said secondary winding of said transformer, said control circuit including a switch unit to be connected to the AC power source and the load so as to interconnect normally the AC power source and the load, said switch unit disconnecting the load from the AC power source when voltage at said secondary winding of said transformer reaches a predetermined overload voltage, wherein said switch unit comprises:
  a DC power source;
  a relay unit with a first coil connected to said secondary winding of said transformer, a second coil, and first and second sets of electrical contacts for connecting the AC power source and the load in a first mode and for connecting said DC power source and the load in a second mode;
  a charging circuit to be connected serially to the load by one of said first and second sets of electrical contacts when said first and second sets of electrical contacts are in said second mode; and
  a comparator having a first input connected to said charging circuit, a second input which receives a reference voltage, and an output terminal connected to said second coil;

whereby, when an overload condition occurs, the voltage at said secondary winding of said transformer becomes sufficient to energize said first coil, thereby actuating said first and second sets of electrical contacts to operate in said second mode, a large voltage drop across said charging circuit due to presence of the overload condition actuating said comparator to energize said second coil to maintain said first and second sets of electrical contacts in said second mode until the overload condition has elapsed.

2. An overload protection device for use in a current-carrying circuit which includes an AC power source and at least one load, said overload protection device comprising:

a resistor to be connected to the AC power source and the load so as to interconnect the AC power source and the load;

a transformer having a primary winding connected across said resistor, and a secondary winding; and a control circuit connected to said secondary winding of said transformer, said control circuit including a switch unit to be connected to the AC power source and the load so as to interconnect normally the AC power source and the load, said switch unit disconnecting the load from the AC power source when voltage at said secondary winding of said transformer reaches a predetermined overload voltage, wherein said switch unit-comprises:
  a DC power source;
  a relay unit with a first coil connected to said secondary winding of said transformer, a second coil, and first and second sets of electrical contacts for connecting the AC power source and the load in a first mode and for connecting said DC power source and the load in a second mode;
  a charging circuit to be connected serially to the load by one of said first and second sets of electrical contacts when said first and second sets of electrical contacts are in said second mode;
  a transistor interconnecting said second coil and said DC power source; and
  a resistor network, including a variable resistor, which interconnects said charging circuit and base of said transistor, said variable resistor being adjustable to adjust correspondingly trigger voltage of said transistor;

whereby, when an overload condition occurs, the voltage at said secondary winding of said transformer becomes sufficient to energize said first coil, thereby actuating said first and second sets of electrical contacts to operate in said second mode, a large voltage drop across said charging circuit due to presence of the overload condition triggering said transistor to conduct so as to energize said second coil and maintain said first and second sets of electrical contacts in said second mode until the overload condition has elapsed.

3. An overload protection device for use in a current-carrying circuit which includes an AC power source and at least one load, said overload protection device comprising:

a resistor to be connected to the AC power source and the load so as to interconnect the AC power source and the load;

a transformer having a primary winding connected across said resistor, and a secondary winding; and a control circuit connected to said secondary winding of said transformer, said control circuit including a switch unit to be connected to the AC power source and the load so as to interconnect normally the AC power source and the load, said switch unit disconnecting the load from the AC power source when voltage at said secondary winding of said transformer reaches a predetermined overload voltage, wherein said switch unit comprises:
  a DC power source;
  a relay unit with a coil connected to said DC power source and first and second sets of electrical contacts for connecting the AC power source and the load in a first mode and for connecting said DC power source and the load in a second mode;
  a thyristor having a gate terminal connected to said secondary winding of said transformer, an anode terminal and a grounded cathode therminal;
  a transistor pair including first and second transistors with interconnected collectors connected to said anode terminial of said thyristor;
  a control transistor having an emitter connected to said DC power source, a base with a variable resistor connected thereat and a collector connected to base of said first transistor, said base of said control transistor to be connected serially by one of said first and second electrical contacts to the load when said electrical contacts are in said second mode; and
  a comparator having a first input connected to the base of said control transistor, a second input which receives a reference voltage, and an output terminal connected to base of said second transistor;
whereby, when an overload condition occurs, the voltage at said secondary winding of said transformer becomes sufficient to cause said thyristor to conduct, current from said DC power source initially flowing through said coil via said first transistor and said thyristor to cause said first and second sets of electrical contacts to operate in said second mode, a large voltage drop across said variable resistor due to presence of the overload condition actuating said comparator to trigger said second transistor to conduct so as to maintain said first and second sets of electrical contacts in said second mode until the overload condition has elapsed.

4. An overload protection device for use in a current-carrying circuit which includes an AC power source and at least one load, said overload protection device comprising:
  resistor to be connected to the AC power source and the load so as to interconnect the AC power source and the load;
  a transformer having a primary winding connected across said resistor, and a secondary winding; and
  a control circuit connected to said secondary winding of said transformer, said control circuit including a switch unit to be connected to the AC power source and the load so as to interconnect normally the AC power source and the load, said switch unit disconnecting the load from the AC power source when voltage at said secondary winding of said transformer reaches a predetermined overload voltage,
wherein said switch unit comprises:
  a DC power source;
  a relay unit with a coil connected to said DC power source and first and second sets of electrical contacts for connecting the AC power source and the load in a first mode and for connecting said DC power source and the load in a second mode;
  a thyristor having a gate terminal connected to said secondary winding of said transformer, an anode terminal and a grounded cathode therminal;
  a transistor pair including first and second transistors with interconnected collectors connected to said coil and interconnected emitters connected to said anode terminal of said thyristor;
  a charging circuit to be connected serially to the load by one of said first and second sets of electrical contacts when said first and second set of electrical contacts are in said second mode;
  a first comparator having a first input connected to said charging circuit, a second input which receives a reference voltage, and an output terminal connected to base of said second transistor; and
  a second comparator having a first input which receives a reference voltage, a second input connected to said charging circuit, and an output terminal connected to base of said first transistor;
whereby, when an overload condition occurs, the voltage at said secondary winding of said transformer becomes sufficient to cause said thyristor to conduct, current from said DC power source initially flowing through said coil via said first transistor and said thysistor to cause said first and second set of electrical contacts to operate in said second mode, a large voltage drop across said charging circuit due to presence of the overload condition causing said second comparator to deactivate said first transistor and actuating said first comparator to trigger said second transistor to conduct so as to maintain said first and second sets of electrical contacts in said second mode until the overload condition has elapsed.

* * * * *